Jan. 17, 1928.    1,656,168

D. CARROLL

LOCK FOR ANTISKID CHAINS

Filed Oct. 4, 1926

Inventor
DANIEL CARROLL

Patented Jan. 17, 1928.

1,656,168

UNITED STATES PATENT OFFICE.

DANIEL CARROLL, OF COLUMBUS, OHIO.

LOCK FOR ANTISKID CHAINS.

Application filed October 4, 1926. Serial No. 139,302.

The object of this invention, generally, is to provide an improved, inexpensive and easily operated connection or lock for the side chains of anti-skidding devices.

The invention is embodied in the example herein shown and described, the features of novelty being finally claimed.

In the accompanying drawing—

Figure 1:
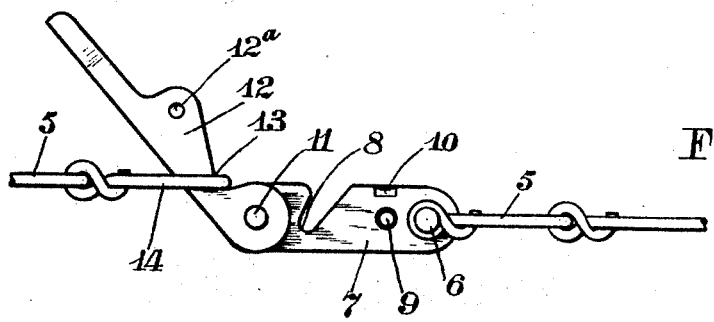
Figure 1 is a view in side elevation of the locking device opened with the free end of the side chain in the locking member ready for turning into the hook member.

In the views 5 designates the ends of the usual side chain, one of which has pivotally and permanently connected to it by means of a riveted or headed pin 6 the hook member 7. The hook member consists of a stout, short piece of flat bar having one edge cut with a deep inclined notch 8, and with recesses 9 in its opposite sides. The upper edge of the hook member 7 opposite the recesses 9 is sharpened or beveled as shown at 10 for the purpose to be presently explained.

Figure 2:
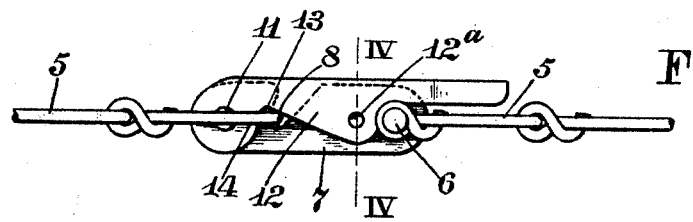
Fig. 2 is a similar view showing the locking member closed to locking position.
Figure 3:
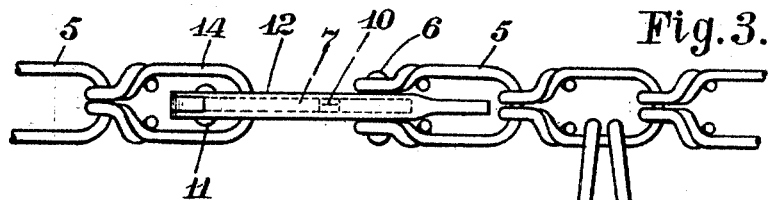
Fig. 3 is a top plan view of the parts as shown in Fig. 2.
Figure 4:
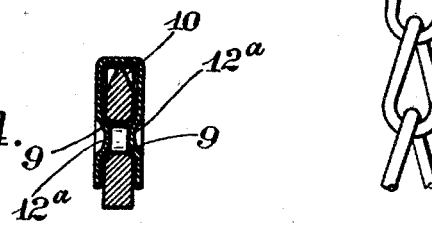
Fig. 4 is a section on the line IV—IV Fig. 2 such section being on a magnified scale.

Pivoted on a riveted or headed pin 11 at that end of the hook member opposite that containing the pin 6 is the locking member 12, said member consisting of a piece of stout sheet metal bent or doubled to U-shape in cross section as to fit or close down on the hook member 7 in "jack-knife" fashion. The hook member has a recess 13 and rounded nodules 12ª facing each other struck up in wings of the locking member, said nodules springing into the recesses 9 of the hook member when the locking member is closed on the hook member, as best seen in Figs. 2 and 4. The beveled portion of the hook member at 10 permits the easy closing of the locking member on the hook member, the nodules being sprung slightly apart as the locking member is going to full closed position at which position they spring toward each other into locking position and where they become engaged with the recesses 9.

The wings of the base of the locking member where they are pivotally connected with the hook member are formed on arcs of circles. In the closed position of the parts they do not quite coincide with the bottom of the notch or recess 8 of the hook member hence when the locking member is in locking position the connected end of the side chain in said notch does not draw on the locking member but on the hook member only or mainly.

In practice when the free end of the side chain is to be connected with the hook the end link (as at 14) is passed down on the locking member until it rests in the recess or seat 13 of said member after which the locking member, serving as a lever, is drawn over and pressed home to locking position as best shown in Figs. 2 and 4. In this movement the link is carried to the notch 9 where it finds its seat in the bottom thereof it being there held until the locking member is intentionally disengaged by force raising it in the opposite direction. Placing the end of the link 14 in the seat 13 may be the ordinary practice, but said link can be primarily placed in the seat of the notch 8 if the chain be loose enough to permit that and the lock turned down as before.

The forms of the parts can be changed without departing from the gist of the invention as claimed.

What I claim is:

1. A lock for the side chain of an antiskid device consisting of a hook member on one end of the side chain, said hook member being of single ply and having a seat for a link at the other end of said side chain, said hook member also having a locking device U-shaped in cross section pivoted to said hook member to straddle the same, said locking device having means thereon for removably engaging said hook member, said hook member having a beveled edge facilitating the closing of said locking means on said hook member.

2. A lock for the side chain of an anti-skid device consisting of a hook member on one end of the side chain, said hook member being of single ply and having a seat for a link at the other end of said side chain, said hook member having a locking device U-shaped in cross-section pivoted to said hook member to straddle the same, said locking device having means thereon for removably engaging said hook member, said locking member having a seat for receiving and carrying said link into its seat in the hook when the locking member is moved toward closing position.

3. A lock for the side chain of an anti-skid device consisting of a hook member on one end of the side chain, said hook member being of single ply and having a seat for a link at the other end of said side chain, said hook member having a locking device consisting of a lever of U-shape in cross section to straddle the hook member and having a temporary seat for said link, said lever pivoted to the hook member, the said seat for the link in the hook member projecting beyond the seat for the link in the locking device whereby the stress of the link is borne by the hook member and not by the locking device in closed position of the lock.

DANIEL CARROLL.